United States Patent [19]
Corbin

[11] 3,954,290
[45] May 4, 1976

[54] RAIN GUARD FOR UPWARDLY EXTENDING EXHAUST PIPES

[76] Inventor: Dean L. Corbin, 1349 Prospect, Blair, Nebr. 68008

[22] Filed: Mar. 11, 1974

[21] Appl. No.: 450,081

Related U.S. Application Data

[63] Continuation-in-part of Ser. No. 434,798, Jan. 21, 1974, abandoned.

[52] U.S. Cl. ................................................. 285/322
[51] Int. Cl.² ........................................ F16L 21/06
[58] Field of Search ............... 285/13, 14, 317, 319, 285/321, 323, 257, 140, 322

[56] References Cited
UNITED STATES PATENTS

| | | | |
|---|---|---|---|
| 2,556,659 | 6/1951 | Patterson | 285/317 X |
| 2,906,549 | 9/1959 | Summers | 285/317 |
| 3,724,882 | 4/1973 | Dehar | 285/257 X |

*Primary Examiner*—G. V. Larkin
*Attorney, Agent, or Firm*—Hiram A. Sturges

[57] ABSTRACT

A rain guard for upwardly extending exhaust pipes comprising a bent tube having horizontally spaced legs clampable against an exhaust pipe by a clamp, the clamp being disposed partially on the inside of the tube, the legs being of one piece with the tube.

4 Claims, 3 Drawing Figures

RAIN GUARD FOR UPWARDLY EXTENDING EXHAUST PIPES

This application is a continuation-in-part of the applicant's co-pending patent application Ser. No. 434,798, filed Jan. 21, 1974, titled RAIN GUARD FOR UP-STANDING EXHAUST PIPES, and now abandoned.

FIELD OF THE INVENTION

This invention is in the field of rain guards for exhaust pipes of the upwardly extending type and for the purpose of preventing rain from entering such exhaust pipes and doing damage to engines to which the exhaust pipes are connected. Such exhaust pipes are commonly found on trucks, tractors, and stationary engines. This rain guard is also in the field of use for rain protection of upwardly extending pipes of any kind.

DESCRIPTION OF THE PRIOR ART

In the prior art, many diesel exhaust pipe installations are without rain guards, even though rain guards have been on the market for decades. One of the reasons for this, in my opinion, is that rain guards of the prior art have either been so complex as to be too costly of manufacture and of too short a useful life, or have been so simple that they have failed to keep out a sufficient amount of rain and snow.

One of the simplest prior art types has been a plain curved tube inwardly swaged to be narrow at its top, yet large at its bottom to receive an exhaust pipe of larger diameter than the upper part of the rain guard. With this type, when the wind is in a certain direction, rain will freely blow into the pipe and will go directly down into the engine causing damage.

Rain guards of the type just described are commonly outwardly swaged to provide an outwardly offset portion of larger diameter at their lower ends, so that the inwardly swaged portion rests on and is supported by the top edge of the exhaust pipe. But with such a construction, the rain flowing down the inside of the upper portion of the rain guard tube is guided into the exhaust pipe and into the engine causing damage. My concept reverses this by having my top portion of larger diameter than exhaust pipes and upheld entirely by its clamp, so that water passes down outer sides, rather than down the inner side, of the exhaust pipe, and so the rain escapes harmlessly.

A further object is to provide sufficient space between the lower part of the rain guard and the exhaust pipe to allow rain to fall harmlessly downwardly therebetween so that rain water cannot build up in the rain guard and enter into the exhaust pipe because of such a buildup.

Another type of prior art rain guards had depended upon a valve mounted on the upper end of an exhaust pipe and opening from exhaust gas pressure but closing and remaining closed whenever exhaust gas pressure has ceased. However, such rain guards of the valving type put a back pressure on an engine as is undesirable and also they often malfunction and stick in a single position.

Particular objects are to provide an economical, strong, compact rain guard model in which the legs are struck from the tube material and the clamp is mostly hidden from horizontal view, being tucked behind tube parts that are disposed between the legs, substantially only a worm gear assembly extending beyond the circular outline of adjacent tube portions.

SUMMARY OF THE INVENTION

A rain guard for exhaust pipes of the upardly extending type comprising a tube, a plurality of horizontally spaced legs extending around the lower end of the tube, a clamp around the lower ends of the legs and pressing the lower ends against the exhaust pipe for supporting the guard upright in an intended position, the exhaust pipe being spaced sufficiently from the rain guard tube as to permit rain water to pass downwardly therebetween at times when rain or snow enters the upper end of the exhaust pipe.

The tube has an upper opening horizontally offset from a straight line disposed between said legs sufficiently to prevent rain from falling directly into the exhaust pipe.

The legs are struck from the same material as the tube for strength and economy, said legs being bent inwardly toward a center of said tube to receive the clamp around the outer sides of said legs, those parts of the band which are between said legs being at least mostly disposed on the inner side of the tube for engaging an exhaust pipe.

The clamp has a perforated band portion and has a worm gear assembly portion attached to and cooperative with the band portion for tightening the band portion, the worm gear portion being disposed on the outer side of one of the legs, each leg having two upwardly extending side edges, the entire worm gear portion being disposed between the upwardly extending side edges of one of the legs as the tube is viewed horizontally from the corresponding side with its legs downwardly extending.

DESCRIPTION OF THE PREFERRED EMBODIMENT

Figure 1:
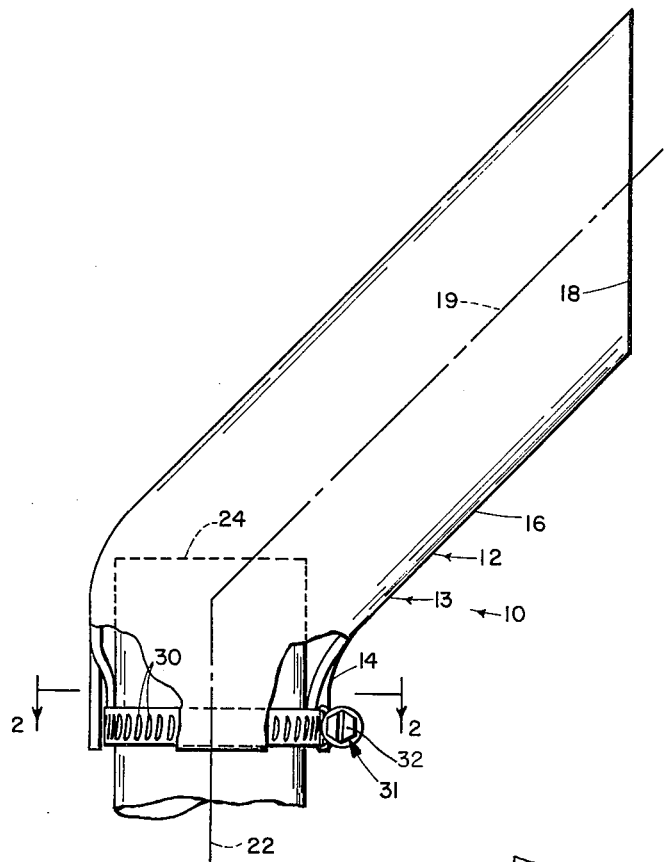
FIG. 1 is a side elevation of the rain guard of this invention shown in assembly with an exhaust pipe, a lower portion of the exhaust pipe and some portions of the rain guard are broken away for convenience of illustration, an upper end of the exhaust pipe is shown in dotted lines.

The rain guard and exhaust pipe assembly of this invention is generally indicated in FIG. 1 at 10 and comprises a rain guard tube 12 having a lower portion 14 of approximately cylindrical shape and having an upper portion 16 also of cylindrical shape, the upper portion having an axis or center line 19 which is disposed at an obtuse angle with respect to the axis or center line 22 of the lower portion 14 of the rain guard tube 12.

The lower and upper portions 14 and 16 are interconnected by a central portion which is bent, all parts of the tube 12 being integral with one another and formed of one piece, preferably from a single piece of tubing of an original straight cylindrical shape.

The tube 12 has an upper end 18 which is open and which can be, for example, disposed along a vertical plane, if desired, although its exact position is not critical.

The lower portion 14 of the tube has multiple pairs of spaced slits 25 and has legs formed therebetween, as seen at 26. A plurality of legs is used but two are adequate as shown.

The two legs 26 are disposed on opposite sides of the lower portion 14 of the tube. Each leg 26 is bent inwardly at its lower end, as best seen in FIG. 1, so that the band portion 29 of a clamp 31 can be received between the legs 26 and the remainder of the lower portion 14 of the tube.

The band 29 is provided with perforations spaced along its length, as seen at 30, which latter are adapted to cooperate with band-tightening assembly or worm gear assembly 50 which engages the perforations 30 for drawing a portion of the band 29 through the worm gear assembly 50 as the control portion or screw 32 of the worm gear assembly 50 is rotated.

Clamps of the type shown at 27 are commonly used on automobiles, but to my knowledge, none has ever been used for a rain guard.

Figure 2:
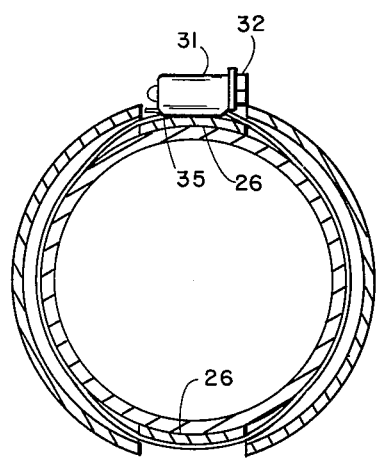
FIG. 2 is a sectional view taken along the line 2—2 of FIG. 1.

As best seen in FIG. 2, one end of the clamp band 29 is attached at a point 35 to the worm gear assembly 50 and the other end of the band 29 is received slidably through the worm gear assembly 50.

The upper end opening 18 of the tube 12 has its entirety, or at least most of its area, disposed faced horizontally from the legs 26 so that vertically falling rain will not tend to fall directly into the upper end 24 of an exhaust pipe 20 when the exhaust pipe is received between the legs 26.

The clamp 27 is sufficiently strong that when it is tightened, its pressure will force the legs 26 against the exhaust pipe with sufficiently force to support the entire rain guard against the forces of gravity and vibration so as to cause it to maintains its position on the exhaust pipe, even when the exhaust pipe is on a vehicle such as a truck, which experiences great vibration.

As thus described, it will be seen that the legs 26 bound a space, as the rain guard is seen from the underside, and that each leg 26 can be bent inwardly toward a center of the pipe space, as the rain guard is seen in bottom plan view.

The opening at the upper end 18 of the tube is disposed offset horizontally from the pipe space between the legs, or mostly so, so as to tend to keep vertically falling rain drops from entering the top of the exhaust pipe 20.

Figure 3:
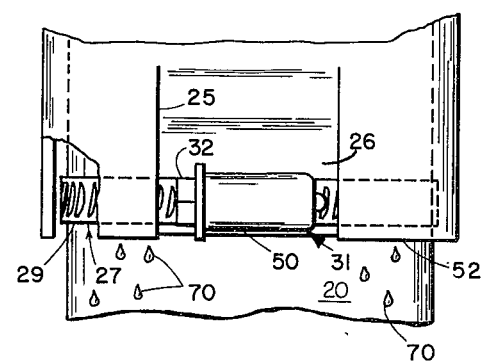
FIG. 3 is a detail showing a portion of the assembly of FIG. 1 as it would be seen from its rearward side which is from the right-hand side as seen in FIG. 1, a portion of the tube being broken away.

In operation, it will be found that no water can fall directly vertically into the open upper end 24 of the exhaust pipe 20. Any rain or snow which does come through the open end at 18 of the tube 12 will tend to fall by gravity toward the bottom surface of the upper portion 16 of the tube 12 and then fall downwardly into a position alongside the exhaust pipe 20, whereby the moisture will fall out alongside the exhaust pipe 20 from under those parts of the lower portion 14 of the tube 12 which are disposed inbetween the legs 26. Moisture falling out from these positions can be seen at 70 in FIG. 3.

I claim:

1. A rain guard for exhaust pipes of the upwardly extending type, said rain guard comprising: a tube, a plurality of horizontally spaced legs extending downwardly and disposed beneath the lower end of said tube, said legs bounding a space for receiving therein an end portion of an exhaust pipe, said legs being bendable for the bending of their lower ends towards the center of said space as seen in bottom plan view, and a clamp disposed around outer sides of said legs and adapted to press the lower ends of said legs horizontally inwardly towards the center of said space, the upper end of said tube having an opening at least most of which is disposed spaced horizontally from said legs to keep vertically falling rain drops from entering said exhaust pipe, means attaching said legs to said tube.

2. The rain guard of claim 1 having an exhaust pipe disposed in a position between said legs, said pipe closely lapping said legs, said clamp clamping said legs against said pipe, said exhaust pipe being spaced from said tube at at least one place sufficiently to allow rain water to pass downwardly between said tube and said pipe.

3. The rain guard of claim 1 further comprising lower end portions of said legs being disposed at times when said clamp is not pressing on them off-set horizontally inwardly from upper portions of said legs respectively to receive said clamp around the outer sides of said legs, said clamp having a band portion, certain parts of said band portion being between said legs and said band portion being at least mostly disposed on the inner sides of said legs.

4. A combination rain guard and exhaust pipe comprising: said exhaust pipe being elongated and of the upwardly extending type, said rain guard comprising: a tube having a lower portion surrounding said exhaust pipe, said tube having an upper end portion having an exhaust opening, said tube having the edges of its said exhaust opening spaced horizontally from the bottom of said tube so that vertically falling rain cannot enter said exhaust pipe, and means firmly securing said lower portion of said tube to said exhaust pipe, said rain guard tube being spaced from said exhaust pipe at at least one place to allow rain water to pass downwardly between said tube and said pipe.

* * * * *